Patented Nov. 4, 1947

2,430,300

UNITED STATES PATENT OFFICE 2,430,300

MATERIAL FOR TREATING BOILER FEED WATER AND PREPARATION THEREOF

Thomas L. Pankey, Wauwatosa, and Carroll E. Imhoff, Calhoun Farms, Wis., assignors to Allis-Chalmers Manufacturing Company, Milwaukee, Wis., a corporation of Delaware No Drawing. Application January 20, 1945, Serial No. 573,808

3 Claims. (Cl. 252—175)

This application is a continuation in part of application Serial No. 415,224, filed October 16, 1941, which latter application is a division of application Serial No. 392,218, filed May 7, 1941, now U. S. Patent No. 2,382,902, granted August 14, 1945.

The present invention relates generally to improvements in materials and methods for removing impurities from water and relates more particularly to the provision of an improved activated material and process for producing such material for use in the treatment of the water, such as feedwater for a steam boiler, for reducing the silica content of the water.

The water supplies for steam generation are normally contaminated by various impurities which are later concentrated by evaporation of the water. These impurities form scale which deposits on the heat transfer surfaces of the boiler; the impurities also form a sludge which gathers in the so-called mud drum of the boiler. The character and composition of the impurities vary, depending on the nature of the materials with which the water had come into contact. Of particular interest are the inorganic materials which are dissolved or suspended in the water. The impurities most frequently encountered in boiler feedwater are calcium and magnesium compounds and silica, which is frequently present in suspended or colloidal form and also present in molecular form such as amounts to a state of true solution in the water, according to many authorities. This latter form of silica is herein referred to as silica in solution or dissolved silica, and produces a particularly hard and tenacious scale when deposited on boiler heat transfer surfaces. The presence of calcium and magnesium salts in water are responsible for its so-called hardness, the acid carbonates causing temporary hardness and the other salts of calcium and magnesium causing permanent hardness. However, calcium and magnesium salts can be removed from water by any one of several known methods of water softening, but the softening materials and methods heretofore known have met with but little, if any, commercial success in removing dissolved silica from the feedwater.

The problem of silica removal from boiler feedwater is becoming increasingly important in modern high pressure and high temperature power plants which require a large quantity of makeup water. Decreased efficiency of the steam and power generating equipment as well as direct financial losses, due to the cost of, and time lost in outages for the elaborate chemical and mechanical cleaning operations necessary to remove the dense and hard silica deposits, are often the direct result of using boiler feedwater having a high silica content. Although dissolved silica is found normally in natural waters in relatively limited amounts; namely, from 1 to 60 P. P. M., depending on the source of the water, nevertheless it is essential to further limit the silica content of the boiler feedwater to a maximum ranging from approximately 1 to 20 P. P. M. depending on the steam boiler pressure employed at any particular plant.

Silica, a compound of silicon and oxygen, is found abundantly and widely distributed in nature. Most natural waters contain some measurable amount of silica in solution, in addition to silica carried in suspended or colloidal form. The suspended or colloidal silica can be removed by coagulation followed by settling or filtration or by a combination of both such operations. Dissolved silica must, however, be removed by chemical or chemical-physical means. Chemical means for removing silica from solution in water have not proved successful because no sufficiently insoluble silica compounds are formed to permit removal by the precipitation methods usual in water softening. The base exchange method is also ineffective in removing such silica. It is known, however, that the process of adsorption may be used for removing dissolved silica if a suitable adsorbent is utilized. It is known that magnesium oxide will adsorb silica in varying amounts depending upon the concentrations of the silica and the magnesium oxide, the temperature of the solution, and the density of the magnesium oxide. The prior art also discloses the use of various magnesium compounds, the use of magnesium oxide prepared in various ways and the use of magnesium hydroxide prepared in various ways in an attempt to secure the effective adsorption of silica. It has also been proposed to utilize dolomitic limes (56% $CaCO_3$ and 44% $MgCO_3$) as a source of magnesium oxide for silica removal. However, such heretofore proposed uses and methods for the preparation and use of magnesium compounds have not successfully realized their fullest capacity as silica adsorbing materials.

It is therefore an object of the present invention to provide an improved process for activating a material to increase the silica adsorbing properties thereof.

Another object of the present invention is to provide an improved activated material for use in the treatment of water to effectively remove dissolved silica therefrom.

Another object of this invention is to provide an improved process for preparing magnesium-containing materials for use in removing dissolved silica from water.

Another object of the invention is to provide an improved material for use in treating feedwater for boilers to reduce the dissolved silica content thereof, said material being the resultant reaction product of heating, at a temperature of approximately 212° F. for a suitable period, an aqueous slurry mixture containing 1.5 to 4.5 parts of magnesium hydroxide and one part of soluble silica containing material, expressed as equivalent $SiO_2$.

A further object of the present invention is to provide an improved process for producing an activated silica adsorbing material for treating water containing silica in solution to remove the dissolved silica therefrom, which process includes, bringing magnesium hydroxide into aqueous contact with a soluble silicon compound.

An additional object of the present invention is to provide a process for producing an activated silica adsorbing material for treating water containing silica in solution to remove the dissolved silica therefrom, which comprises, mixing from 1.5 to 4.5 parts of magnesium hydroxide per part of soluble silicate, expressed as equivalent $SiO_2$, in water at a temperature of approximately 212° F. for a suitable period.

In carrying out the process of the present invention, magnesium hydroxide obtained from any suitable source may be utilized. However, it has been found that an active and readily obtainable form of magnesium hydroxide which may be utilized in the present process with exceptionally good results can be obtained from dolomitic limestone (usually written as $CaCO_3 \cdot MgCO_3$, with approximately 56% $CaCO_3$ and 44% of $MgCO_3$), especially certain dolomites found in areas producing a stone which is burnable to produce what is commonly known in the plastering art as a "fat lime." Since the degree of adsorption in any process is highly dependent upon the extent of the surface of the adsorbent, it is preferable to utilize a magnesium bearing limestone which is capable of reaching a fine state of subdivision as the source of magnesium hydroxide for use in the present process. We have found dolomitic limestones of the particular source and character described in our above mentioned U. S. Patent No. 2,382,902, granted August 14, 1945, as preferable forms of limestone.

The process for producing the improved activated material may be carried out in a commercial way in the following manner and under the conditions hereinafter set forth.

1. A water-soluble silicate, such as sodium silicate, is dissolved in water and magnesium hydroxide is added to the solution.

2. The above described reagents are allowed to react at a temperature of preferably approximately 212° F. for a period of one to three hours. The temperature may range from 200° to 220° F.; and if the time element from the standpoint of commercial economy is not too critical, the time may be profitably extended for a longer period to produce a more completely activated material.

3. The alkalinity during the reaction is adjusted so as not to exceed 100 P. P. M. of alkali hydroxide, carbonate and bicarbonate expressed as calcium carbonate (parts of alkali per million parts of water).

The limits within which the ingredients may be varied without materially affecting the desired properties of the final material have been found to be a proportion of from 1.5 to 4.5 parts of magnesium hydroxide per part of soluble silicate, expressed as equivalent $SiO_2$, in at least a sufficient quantity of water to maintain a light slurry. To maintain a light slurry, at least one part of water per part of mixture is necessary. The term "approximately 212° F." is intended to cover a range of 200° to 220° F. The silica, in the form of a silicate, added to the water in this process may be in the form of any water-soluble silicate, i. e., existing as such at the time of adding the same to the water, and including any form of silicate which may be so treated as to result in a form of water-soluble silicate at the time of aqueous contact. The silica component of the water-soluble silicate dissolved in the water is presumed, and is accepted by authorities, as being in the form of $SiO_2$ in solution. If there is any appreciable original amount of dissolved silica in the water used in the above treatment, then the presence and amount of such dissolved silica should be considered in determining the amount of added silica, in the form of soluble silicate used, since the foregoing limiting proportions are based on the total amount of silica in solution. The magnesium likewise may be added in any form which will result in a form of magnesium hydroxide at the time of aqueous contact. It has been observed that, although the magnesium hydroxide and the added silicon compound may be introduced into the water simultaneously or at separate times without regard to order of introduction, there is, however, no reaction between the magnesium hydroxide and the silicon compound until after the silica has gone into solution. The process of activation may be aided by stirring the mixture. X-ray diffraction tests of the final product fail to show the formation of any new or known compounds, but the desired useful product resulting from the present process is found to have considerably higher silica adsorption properties than unactivated magnesium hydroxide.

The following is a specific example illustrative of the improved process for producing an activated material in accordance with the present invention, and offers a comparison of the results obtainable with such material and an unactivated material:

(1) One gram of a compound containing CaO and MgO, in the approximate proportions of 56 to 44, was slaked in 200 milliliters of distilled water for 30 minutes to form $Ca(OH)_2$ and $Mg(OH)_2$. The $Ca(OH)_2$ formed was neutralized by conversion to $CaCO_3$ by passing $CO_2$ through the mixture, leaving the $Mg(OH)_2$ unaltered. 0.49 gram $Na_2SiO_3$ which is equivalent to 0.1 gram $SiO_2$, was neutralized by adding HCl and this neutral solution totaling 57.8 milliliters was added to the $Mg(OH)_2$ mixture to yield a total quantity of 257.8 milliliters containing 378 P. P. M. $SiO_2$. The entire mixture was boiled (212° F.) for two hours and the vapors were condensed and returned to the stainless steel flask by a reflux condenser. The alkalinity was below 100 P. P. M.

(2) To secure a fully comparative unactivated sample, the same amount (one gram) of the same compound (56% CaO and 44% MgO) was slaked in the same amount of distilled water (200 milliliters) for the same time (30 minutes). The $Ca(OH)_2$ was neutralized in the same manner as above, by conversion to $CaCO_3$ by passing $CO_2$ through the mixture, leaving the $Mg(OH)_2$ unaltered. NaOH in an amount equivalent to 0.49 gram $Na_2SiO_3$ was then neutralized, in the same manner as the $Na_2SiO_3$ in sample 1, by adding HCl. The same quantity of this neutral solution (57.8 milliliters) was added to the $Mg(OH)_2$ mixture to yield the same quantity of final mixture (257.8 milliliters) containing all of the same salts as the above mixture excepting the $SiO_2$. The alkalinity of the unactivated sample was the same as that of the activated mixture.

(3) A test water was made using distilled water, $Na_2SiO_3$ and HCl to provide an $SiO_2$ solution of 42.4 P. P. M. of $SiO_2$. The same quantity of the test water was added to both the activated mixture 1 and the unactivated sample 2, which had the effect of diluting the $SiO_2$ concentration to 28 P. P. M. in each case, and was allowed to react at room temperature. Determinations of the $SiO_2$ remaining in each solution were made simultaneously with the following results:

| Adsorption time in minutes | P. P. M. $SiO_2$ remaining in solution | |
| --- | --- | --- |
| | Activated Mixture (1) | Unactivated Sample (2) |
| Start | 28 | 28 |
| 20 | 22 | 27.8 |
| 35 | 20 | 27.3 |
| 60 | 19 | 25.5 |
| 120 | 16.8 | 25.5 |

The characteristics of the activated silica adsorbing material are as follows:

1. The ratio of $SiO_2$ to MgO in this material is much higher than is formed by straight adsorption of silica on unactivated magnesium hydroxide;
2. The activated material shows no X-ray lines for magnesium hydroxide, and in the process of activation the X-ray lines for magnesium hydroxide gradually fade out, showing that the process is gradual and that time is an important factor in securing the most highly activated material;
3. The rate of silica adsorption in the final water treatment is decidedly faster with the activated material than with unactivated magnesium hydroxide;
4. Although temperature favors the action, reactivity in the cold remains quite high.

From the foregoing, it will be apparent that applicants have provided a new and improved activated material and process for producing such material which has a greatly increased silica adsorbing capacity. The process of activation as hereinabove described may be accompanied by agitation to hasten the reaction. When the process is carried out in the manner described and under the conditions set forth, X-ray tests of the resultant activated material fail to indicate the presence of any newly formed compounds. However, when such material is utilized in the treatment of water, it is clearly shown to have increased silica adsorbing qualities. A magnesium hydroxide obtained from an inexpensive and readily available source, such as dolomitic limestone, may be used in the present process with excellent results. The present improved process is concerned with the production of a material which may be advantageously employed for use in the treatment of water to be supplied to a steam boiler for reducing the silicon content of such water. The material produced by the present process may be readily prepared for commercial use by drying the sludge and then packaging and selling the activated material in solidified form.

Although we have referred herein to the use of certain dolomites as a possible source of magnesium hydroxide to be used in our process, it should be understood that the process is not limited to use of such particular sources. Furthermore, although but one example of the present process and compositions used in carrying out such process to produce the improved material has been described herein, it is not intended to limit the invention thereto as various substitutes and modifications within the scope of the claims may occur to others skilled in the art.

It is claimed and desired to secure by Letters Patent:

1. A process for producing an activated silica adsorbing material for treating water containing silica in solution to remove said dissolved silica therefrom, which comprises, bringing magnesium hydroxide into contact with a water-soluble silicate in the amounts of 1.5 to 4.5 parts of magnesium hydroxide per part of water-soluble silicate expressed as equivalent $SiO_2$ in at least a sufficient quantity of water to maintain a light slurry at a temperature of approximately 212° F. for a period of at least one hour while maintaining the alkalinity of the solution below 100 P. P. M. of alkali hydroxide, carbonate and bicarbonate expressed as calcium carbonate.

2. A process for producing an activated silica adsorbing material for treating water containing silica in solution to remove said dissolved silica therefrom, which comprises, mixing from 1.5 to 4.5 parts of magnesium hydroxide per part of water-soluble silicate expressed as equivalent $SiO_2$ in at least a sufficient amount of water to maintain a light slurry and maintaining the temperature of the mixture at approximately 212° F. for a period of one to three hours while maintaining the alkalinity of the solution below 100 P. P. M. of alkali hydroxide, carbonate and bicarbonate expressed as calcium carbonate.

3. A material for use in treating feedwater for boilers to reduce the dissolved silica content thereof, said material being the resultant reaction product of heating at a temperature of approximately 212° F. for at least one hour under conditions of alkalinity maintained below 100 P. P. M. of alkali hydroxide, carbonate and bicarbonate expressed as calcium carbonate an aqueous slurry mixture containing 1.5 to 4.5 parts of magnesium hydroxide and one part of water-soluble silicate, expressed as equivalent $SiO_2$.

THOMAS L. PANKEY.
CARROLL E. IMHOFF.

REFERENCES CITED

The following references are of record in the file of this patent:

UNITED STATES PATENTS

| Number | Name | Date |
| --- | --- | --- |
| 2,313,194 | Fiedler et al. | Mar. 9, 1943 |

FOREIGN PATENTS

| Number | Country | Date |
| --- | --- | --- |
| 3,730 | Great Britain | 1886 |

OTHER REFERENCES

Mechanical Engineering, Jan. 1941, pages 34 and 35. Article entitled "Silica removal."